United States Patent [19]

Schreiber et al.

[11] 3,852,482

[45] Dec. 3, 1974

[54] PROCESS OF ALTERING THE FLAVOR OF A TOMATO SOUP MIX WITH 2-PHENYL-4-PENTENAL

[75] Inventors: William Lewis Schreiber, Jackson; Manfred Vock, Locust, both of N.J.; Edward Joseph Shuster, New York, NY; Alan O. Pittet, Atlantic Highlands, N.J.

[73] Assignee: International Flavors & Fragrances, Inc., New York, N.Y.

[22] Filed: Aug. 25, 1972

[21] Appl. No.: 283,651

[52] U.S. Cl. .................................................. 426/65
[51] Int. Cl. .............................................. A23l 1/26
[58] Field of Search ...................................... 426/65

[56] References Cited

UNITED STATES PATENTS

| | | | |
|---|---|---|---|
| 3,582,360 | 1/1971 | Van Praag et al. | 426/65 |
| 3,694,232 | 9/1972 | Hall et al. | 426/65 |

*Primary Examiner*—Joseph M. Golian
*Attorney, Agent, or Firm*—Brooks, Haidt & Haffner

[57] ABSTRACT

Foodstuff flavor and aroma, and perfume aroma augmenting compositions containing a quantity of 2-phenyl-4-pentenal sufficient to alter the aroma and/or organoleptic characteristics of said compositions, methods for preparing same, and foodstuff, and perfumed materials containing 2-phenyl-4-pentenal.

1 Claim, No Drawings

PROCESS OF ALTERING THE FLAVOR OF A TOMATO SOUP MIX WITH 2-PHENYL-4-PENTENAL

BACKGROUND OF THE INVENTION

The present invention relates to novel methods and compositions using 2-phenyl-4-pentenal to alter the flavor and/or aroma of consumable materials.

There has been considerable work performed relating to substances which can be used to impart flavors to various consumable materials. These substances are used to diminish natural materials some of which may be in short supply, and to provide more uniform properties in the finished product.

Tomato flavors, potato flavors, vegetable flavors in general, nutty flavors, mint flavors, citrus flavors, date flavors, fig flavors, green aromas, styralkyl note-containing aromas and petitgrain aromas are particularly desirable for many uses in consumable articles.

3-Phenyl-pentenals have been suggested in U.S. Pat. application Ser. No. 43,555, filed June 4, 1970 now U.S. Pat. No. 3,694,232 issued on Sept. 26, 1972 for use in cocoa flavors whereby notes characteristic of milk chocolate are provided. 3-Phenyl-4-pentenal is indicated to cause the chocolate beverage to have a fuller, richer sweet milk chocolate flavor. U.S. Pat. No. 3,582,360 issued on June 1, 1971 discloses certain 2-phenyl-2-alkenals as being useful for preparing flavoring compositions and food compositions, particularly those having chocolate or cocoa flavors and/or aroma qualities. Thus, for example, the compound 5-methyl-2-phenyl-2-hexenal is indicated therein to alter imitation cocoa flavor so as to provide a more natural cocoa flavor and impart a character of bitter chocolate.

Acetals are shown to be useful in fragrance formulations at Column 2, lines 50-65 of U.S. Pat. No. 3,636,113. Such acetals have the structures:

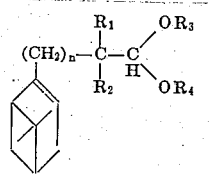

wherein $R_1$ and $R_2$ are either hydrogen or lower alkyl; wherein $R_3$ and $R_4$ are the same or different lower alkyl groups, and wherein $n$ is 1 or 2 and lower alkylene cyclic acetals having the structure

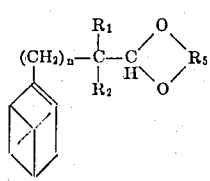

wherein $R_5$ is lower alkylene.

In United States application Ser. No. 43,555 mentioned above, mention is made of the diethyl acetal of 3-phenyl-4-pentenal and the diethyl acetal of 3-phenyl-3-pentenal; but only as intermediates for producing 3-phenyl-3-pentenal and 3-phenyl-2-pentenal from 3-phenyl-4-pentenal.

In West et al. "Synthetic Perfumes: their Chemistry and Preparation," published by Edward, Arnold & Co., London, England, in 1949, on page 315 cinnamaldehyde dimethyl acetal is stated to "have a fine cinnamon-cassia odor which renders it useful in some Chanel-like fancy perfume and in oriental types like Tabac Blond and Fleur de Tabac." Cinnamaldehyde diethyl acetal is also reported. These materials have the following structures:

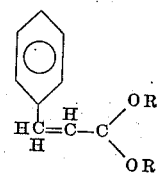

wherein R is methyl or ethyl.

Cinnamaldehyde diethyl acetal is reported in "Perfume and Flavor Chemicals (Aroma Chemicals)" by S. Arctander (published by the author in Montclair, N.J. 11969) as having a "faint but fresh green slightly spicy oily sweet odor and a mild and oily sweet taste." Arctander goes on to state: "since this acetal — like most other acetals — is unstable under mildly acid conditions it finds little if any use in flavor compositions." In addition, Arctander also reports cinnamaldehyde 2,4-dihydroxy-4-methyl-pentane acetal as "soft, tenacious, natural, cinnamon type odor not nearly as harsh as cinnamic aldehyde yet rich and lasting as aldehyde itself." Cinnamic aldehyde dimethyl acetal is also reported by Arctander and with reference to this acetal Arctander states: "It should be noted that pure, aldehyde-free acetal is practically colorless and carries little or no odor similarly to the aldehyde." The ethylene glycol acetal of cinnamic aldehyde is indicated by Arctander to be useful in flavor compositions, such as all spice, cassia, cinnamon, clove and various spice blend and it is stated by Arctander to have a sweet spicy cinnamon all spice taste not quite as sweet as the aldehyde. It should be noted that cinnamic aldehyde ethylene glycol acetal is on the GRAS list and has been given F.E.M.A. No. 2287.

The cinnamic aldehyde and acetals thereof set forth in the prior art are not considered to impart certain desired qualities to consumable materials which the 2-phenyl-4-pentenal of this invention is capable of doing as more specifically described below.

THE INVENTION

It has now been discovered that novel solid and liquid feedstuff and flavoring compositions as well as novel aroma-imparting compositions having tomato or potato or cooked vegetable characteristics and/or cooked green fruity nuances and/or nutty and/or mint notes and/or citrusy notes may be provided by the utilization of 2-phenyl-4-pentenal.

It has further been determined that novel fragrance compositions having imparted thereto green and/or styrally and/or tomato notes found in quality petitgrain perfume formulations may be provided by the use of said 2-phenyl-4-pentenal.

The flavor and aroma properties of 2-phenyl-4-pentenal are more particularly described as follows:

Aroma:
  Green, styrallyl, tomato with green, cooked fruity nuance

Taste:
  At 1 ppm, 2 ppm, and 5 ppm has a characteristic cooked tomato taste. At 10 ppm has a chocolate-like taste with a sweet dried fruit-like nuance; also, sweet green and nutlike.

Accordingly, the 2-phenyl-4-pentenal of our invention has been found to provide certain flavor and aroma notes, not heretofore provided in currently available cooked vegetable (e.g. cooked tomato) flavor formulations and petitgrain perfume formulations.

As used herein in regard to flavors, the term "alter" in its various forms means supplying or imparting a flavor character or note to an otherwise bland, relatively tasteless substance, or augmenting the existing flavor characteristic where a natural flavor is deficient in some regard, or supplementing the existing flavor impression to modify its quality, character or taste.

As used herein the term "foodstuff" includes both solid and liquid ingestible materials which usually do, but need not, have nutritional value. Thus, foodstuffs include meats, gravies, soups, convenience foods, beverages, dairy products, candies, vegetables, cereals, soft drinks, snacks and the like. 2-phenyl-4-pentenal is prepared by first forcing the enamine of morpholine and phenylacetaldehyde. The resulting enamine is then reacted with an allyl halide (such as allyl chloride or allyl bromide whereby the allyl moiety is added to the alpha-carbon atom of the enamine; and an immonium salt is formed. Addition of the allyl halide is carried out in the presence of a solvent preferably acetonitrole and in the absence of any catalyst or in the presence of a potassium or sodium iodide catalyst. Both the reaction to form the enamine of phenylacetaldehyde and the reaction to form the immonium salt are carried out at reflux conditions. The resulting immonium salt is then hydrolyzed whereby the free aldehyde, the 2-phenyl-4-pentenal is produced.

The aforementioned reaction sequence is illustrated as follows:

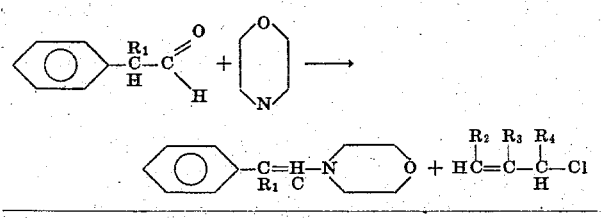

(wherein $R_1$, $R_2$, $R_3$ and $R_4$ are $C_1 - C_3$ lower alkyl)

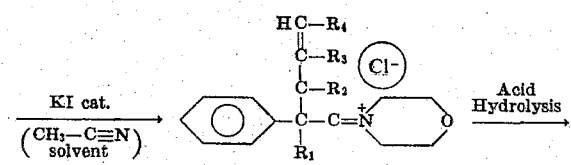

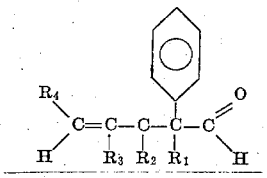

2-phenyl-4-pentenal may also be prepared according to the procedure of Elkik, Bulletin de la Societe Chimique de France 1969 No. 3, pages 903–910 (Title: "Mecanisme d'alcoylation des enamines")

When the 2-phenyl-4-pentenal of this invention is used as a food flavor adjuvant, the nature of the co-ingredients included with the 2-phenyl-4-pentenal in formulating the product composition will, (i.e., as a foodstuff per se or alternatively as a flavoring composition adapted to be added to a foodstuff at some subsequent point of time) serve to alter the organoleptic characteristics of the ultimate foodstuff treated therewith.

Substances suitable for use herein as co-ingredients or flavoring adjuvants are well known in the art for such as use being extensively described in the relevant literature. Apart from the requirement that any such material be "ingestibly" acceptable, and thus non-toxic or otherwise non-deleterious, nothing particularly critical resides in the selection thereof. Accordingly, such materials, which may in general be characterized as flavoring adjuvants or vehicles comprise broadly, stabilizers, thickeners, surface active agents, conditioners, flavorants and flavor intensifiers.

Stabilizer compounds include preservatives, e.g., sodium chloride, antioxidants, e.g., calcium and sodium ascorbate, ascorbic acid, butylated hydroxyanisole (mixture of 2 and 3 tertiary butyl-4-hydroxyanisole), butylated hydroxy toluene (2,6-di-tertiary-butyl-4-methyl phenol), propyl gallate and the like, sequestrants, e.g., citric acid.

Thickener compounds include carriers, binders, protective colloids, suspending agents, emulsifiers and the like, e.g., agaragar; carrageenan; cellulose and cellulose derivatives such as carboxymethyl cellulose and methyl cellulose; natural and synthetic gums such as gum arabic, gum tragacanth; gelatin, proteinaceous materials; lipids; carbohydrates; starches, pectins, and emulsifiers, e.g., mono- and diglycerides of fatty acids, skim milk powder, hexoses, pentoses, disaccharides, e.g., sucrose, corn syrup solids and the like.

Surface active agents include emulsifying agents, e.g., fatty acids such as capric acid, caprylic acid, palmitic acid, myristic acid and the like, mono- and diglycerides of fatty acids, lecithin, defoaming and flavor-dispersing agents such as sorbitan monostearate, potassium stearate, hydrogenated tallow alcohol and the like.

Conditioners include compounds such as bleaching and maturing agents, e.g., benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents, e.g., sodium acetate, ammonium bicarbonate, ammonium phosphate, citric acid, lactic acid, vinegar and the like; colorants, e.g., carminic acid, cochineal, turmeric and curcuma and the like; firming agents such as aluminum sodium sulfate, calcium chloride and calcium gluconate;

texturizers; anti-caking agents, e.g., aluminum calcium sulfate and tribasic calcium phosphate; enzymes; yeast foods, e.g., calcium lactate and calcium sulfate; nutrient supplements, e.g., iron salts such as ferric phosphates, ferrous gluconate and the like, riboflavin, vitamins, zinc sources such as zinc chloride, zinc sulfate and the like.

Flavorants and flavor intensifiers include organic acids, e.g., fatty saturated acids, unsaturated acids and amino acids; alcohols, e.g., primary and secondary alcohols; esters, carbonyl compounds including aldehydes and ketones as well as lactones; cyclic organic materials including benzene derivatives; isocyclics; heterocyclics such as furans, particularly pyridines, pyrazines (particularly monoalkyl, dialkyl, trialkyl and tetraalkyl substituted pyrazines) and the like, sulfur-containing materials including thiazoles, disulfides, thiols, sulfides, aldehydes, (for example, 3-phenyl-4-pentenal, 3-phenyl-3-pentenal, 3-phenyl-2-pentenal, 2-phenyl-2-pentenal, and 2-phenyl-3-methyl-2-butenal; disulfides and the like; so-called flavor potentiators such as monosodium glutamate, guanylates, inosinates, natural and synthetic flavorants such as vanillin, ethyl vanillin, diacetyl, phenethyl 2-furoate, maltol, natural gums and the like; spices, herbs, essential oils and extractives including "bitterness principles" such as theobromin, caffein, naringin and other suitable materials creating a bitter effect.

The specific flavoring adjuvant selected for use may be either solid or liquid, depending upon the desired physical form of the ultimate product, i.e., foodstuff, whether simulated or natural, and should, in any event, be capable of providing an environment in which the 2-phenyl-4-pentenal of our invention can be dispersed or admixed to provide a homogeneous medium. In addition, selection of one or more flavoring adjuvants as well as the quantities thereof will depend upon the precise organoleptic character desired in the finished product; thus, in the case of flavoring compositions, ingredient selection will vary in accordance with the foodstuff to which the flavor and aroma are to be imparted. In contradistinction, in the preparation of solid products, e.g., simulated foodstuffs, ingredients capable of providing normally solid compositions should be selected such as various cellulose derivatives.

As will be appreciated by those skilled in the art, the amount of 2-phenyl-4-pentenal employed in a particular instance can vary over a relatively wide range whereby to achieve desired organoleptic effects having reference to the nature of the product. All parts and percentages given herein are by weight unless otherwise specified. Thus, correspondingly greater amounts would be necessary in those instances wherein the ultimate food composition to be flavored is relatively bland to the taste, whereas relatively minor quantities may suffice for purposes of enhancing a composition merely deficient in natural flavor or aroma. Thus, the primary requirement is that the amount selected be effective, i.e., sufficient to alter the organoleptic characteristics of the parent composition, whether foodstuff per se or flavoring composition. Thus, the use of insufficient quantities of the 2-phenyl-4-pentenal will, of course, substantially vitiate any possibility of obtaining the desired results while excess quantities prove needlessly costly and in extreme cases, may disrupt the flavor-aroma balance, thus proving self-defeating. Accordingly, the terminology "effective amount" and "sufficient amount" is to be accorded a significance in the context of the present invention consistent with the obtention of desired flavoring effects.

Thus, and with respect to ultimate food compositions, it is found that quantities of 2-phenyl-4-pentenal ranging from a small but effective amount, e.g., 1.0 part per million up to about 20 parts per million by weight based on total composition are suitable. Concentrations in excess of the maximum quantities stated are not normally recommended since they fail to provide commensurate enhancement of organoleptic properties. In those instances wherein the 2-phenyl-4-pentenal is added to the foodstuff as an integral component of a flavoring composition, it is, of course, essential that the total quantity of flavoring composition employed be sufficient to yield an effective 2-phenyl-4-pentenal concentration in the foodstuff product.

Food flavoring compositions prepared in accordance with the present invention preferably contain the 2-phenyl-4-pentenal in concentrations ranging from about 20 percent to 100 percent by weight, based on the total weight of said flavoring composition.

The compositions described herein can be prepared according to conventional techniques well known in the art for such purposes. Thus, liquid products as typified by cake batters, egg nog and chocolate milk can be formulated by merely admixing the involved ingredients within the proportions stated in a suitable blender to obtain the desired consistency, homogeneity of dispersion, etc. Alternatively, flavoring compositions in the form of particulate solids can be conveniently prepared by admixing the 2-phenyl-4-pentenal with, for example, gum arabic, gum tragacanth, carrageenan and the like, and thereafter, spray-drying the resultant mixture whereby to obtain the particulate solid product. Pre-prepared flavor mixes in powder form e.g., cocoa mix may be obtained by mixing the dried solid components e.g., milk solids, sugar and the like and the 2-phenyl-4-pentenal of our invention in a dry blender until the requisite degree of uniformity is achieved.

It is presently preferred to combine the 2-phenyl-4-pentenal with the following adjuvants:

Vanillin;
Allyl capreate;
Citral;
amyl butyrate;
2(n-pentyl)thiazole;
2(i-butyl)thiazole;
2(i-propyl)thiazole; 2(n-propyl)thiazole;
The dimethyl acetal of 2-phenyl-4-pentenal;
Methienal;
4-methylthiobutanal;
2-ethyl-3-acetyl pyrazine;
tetramethyl pyrazine;
2-methyl pyrazine;
2-trans hexenal;
Maltel The 2-phenyl-4-pentenal of our invention, when it is used in perfumery, and an additional auxiliary perfume ingredient, including, for example, alcohols, other aldehydes, nitriles, esters, cyclic ethers, and natural essential oils, which are admixed so that the combined odors of the individual components produce a pleasant or desired fragrance. Such perfume compositions usually contain (a) the main note or the "bouquet" or foundation stone of the composition; (b) modifiers which round off and accompany the main note; (c) fixatives which include odorous substances which lend a particular note to the perfume throughout all stages of evaporation and substances which retard evaporation; and (d) topnotes which are usually low boiling fresh smelling materials.

In perfume compositions the individual component will contribute its particular olfactory characteristics, but the overall effect of the perfume composition will be the sum of the effects of each of the ingredients. Thus, the individual compounds of this invention, or mixtures thereof, can be used to alter the aroma characteristics of a perfume composition, for example, by utilizing or moderating the olfactory reaction contributed by another ingredient in the composition.

The amount of the 2-phenyl-4-pentenal of this invention which will be effective in perfume compositions depends in many factors, including the other ingredients, their amounts and the effects which are desired. It has been found that perfume compositions containing as little as 1 percent of the compound of this invention or even less, can be used to impart a scent odor to soaps, cosmetics, and the other products. The amount employed can range up to 5 percent of the fragrance components and will depend on considerations of cost, nature of the end product, the effect desired on the finished product and the particular fragrance sought.

The 2-phenyl-4-pentenal of this invention is useful in a perfume composition as an olfactory component in detergents and soaps; space odorants and deodorants, perfumes; colognes; toilet waters; bath preparations, such as bath oils and bath solids; hair preparations, such as lacquers, brilliantines, pomades and shampoo; cosmetic preparations, such as creams, deodorants, hand lotions, and sun screens; powders, such as talcs, dusting powders, face powders and the like. When used as an olfactory component of a perfumed article, as little as 100 ppm of one or more of the 2-phenyl-4-pentenal of this invention will impart a green, styrallyl, note to petitgrain perfume formulations thereby imparting to such formulations a more natural, full-bodied character; and consequently causing the resulting perfumed article in which the petitgrain formulation is introduced to have a more natural full-bodied petitgrain type aroma.

In addition, the perfume composition or fragrance composition of this invention can contain a vehicle or carrier for the acetals alone or with other ingredients. The vehicle can be a liquid such as an alcohol, non-toxic alcohol, non-toxic glycol, or the like. The carrier can also be an absorbent solid, such as a gum (e.g. gum arabic) or components for encapsulating the composition (such as gelatin).

It will thus be apparent that the acetals according to the present invention can be utilized to alter the sensory property, particularly organoleptic properties, such as flavor and/or fragrance of a wide variety of consumable materials.

The following Examples are given to illustrate embodiments of the invention as it is presently preferred to practice it. It will be understood that these Examples are illustrative, and the invention is not to be considered as restricted thereto except as indicated in the appended claims.

EXAMPLE I

Preparation of 2-Phenyl-4-Pentenal

Into a 500-liter flask equipped with a stirrer, thermometer, water separator, reflux condenser, heating mantle and addition funnel the following materials are added:

| | |
|---|---|
| 8.8 grams | morpholine |
| 250 ml | benzene |
| 12.0 grams | phenylacetaldehyde |

The mixture is refluxed with water separation until no more water is produced from the reaction mixture (period of time: 4 hours). The benzene is then evaporated leaving a yellow solid which is then dissolved in 200 ml. acetonitrile. The acetonitrile acts as a solvent.

The resulting enamine reaction product having the structure:

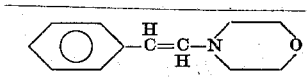

dissolved in acetonitrile is then admixed with 9.0 ml. of allyl chloride. 0.25 Grams of KI (solid) is added and the reaction mixture is then refluxed with stirring for a period of 12 hours. The acetonitrile solvent is then removed by means of adding the reaction mixture to a rotary evaporator. The reaction mass which now contains the immonium salt having the structure:

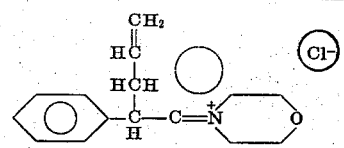

is placed in a 500-ml three-neck flask equipped with stirrer, thermometer and reflux condenser. 300 ml. of 1.5M aqueous hydrochloric acid is added and the reaction mass is stirred for a period of 3 hours. The reaction mass is then placed in a one liter separatory funnel and extracted with three 200 ml. portions of diethyl ether. The diethyl ether is washed successively with 200 ml portions of water and saturated sodium carbonate. The resulting ether extract is then dried over anhydrous sodium sulfate and evaporated thereby yielding a residual red oil. This red oil is rushed over at 0.2 ml mercury pressure yielding 1.70 grams of yellow oil. This material is then passed through a 10 foot × 3/8 inch SE-30 GLC column. IR, mass spectral and NMR analysis confirm the structure of this material as 2-phenyl-4-pentenal.

The NMR data for this compound is as follows:

| P.p.m. | | | Interpretation |
|---|---|---|---|
| 9.65 | (d) | 1H | Formyl proton. |
| 7.62–7.08 | (m) | 5H | Aryl protons. |
| 5.87–5.46 | (m) | 1H | Olefinic proton. |
| 5.06–4.88 | (m) | 2H | Olefinic protons. |
| 3.54 | (t) | 1H | HC=O<br>Aryl—C—CH₂—<br>H |
| 2.92–2.28 | (m) | 2H | Aryl—C—CH₂—C=C |

EXAMPLE II 2-phenyl-4-pentenal prepared according to the process set forth in Example I is added to a commercial instant tomato soup mix ("Tomatencreme Suppe, C. H. Knorr, Heilbrown, West Germany) at the rate of 2 ppm (based on the weight of the soup as ready to eat, produced by adding 80 g. of the dry soup mix to 1,000 ml. water and then bringing the resulting mixture to a boil). A second "control" is prepared which is identical to the initial sample except for the absence of the 2-phenyl-4-pentenal. A four member panel of flavorists compared the control to the soup containing the 2-phenyl-4-pentenal. All four member of the panel indicated a strong preference for the tomato soup containing the 2-phenyl-4-pentenal. All four members of the panel indicated that the soup containing the 2-phenyl-4-pentenal includes a fresh tomato note which is not present in the soup prepared without using the 2-phenyl-4-pentenal.

It was unexpected that although, by itself, 2-phenyl-4-pentenal has a cooked tomato note (on dilution in water), when the soup was prepared as described above a fresh tomato character was achieved.

EXAMPLE III

The following mixture is prepared:

| Ingredient | Parts |
| --- | --- |
| 2-phenyl-4-pentenal | 3 |
| Linaleol | 40 |
| Linalyl Acetate | 60 |
| Terpineol | 5 |
| Terpineol Acetate | 10 |
| Nerolidol | 1 |
| Methyl anthranilate | 0.5 |
| Indol | 1 |
| Gum turpentine oil | 10 |
| Geraniol | 3 |
| Geranyl Acetate | 2 |

The addition of the 2-phenyl-4-pentenal to this petitgrain fragrance formulation imparts to it a green, styrallyl character thereby rendering it more natural and full-bodied.

EXAMPLE IV

POTATO FLAVOR

A potato flavoring material is prepared by admixing the following ingredients:

| Ingredient | Parts by weight |
| --- | --- |
| Diacetyl (1% solution) | 0.20 |
| Furfural | 0.2 |
| 2-acetyl-3-ethyl pyrazine (1% solution) | 1.0 |
| 2-ethyl-3-methyl pyrazine | 4.0 |
| methional | 2.0 |
| 2-phenyl-4-pentenal | 1.0 |
| Ethanol | 91.6 |

A "bench panel" of five individuals compared the above formulation with one not containing any 2-phenyl-4-pentenal but identical in all other respects. The formulations were compared at the rate of 10 ppm in water solutions. It was concluded that the 2-phenyl-4-pentenal imparted to the flavor a fresh raw potato like taste which causes the said formulation to be suitable for use in the production of potato dumplings.

What is claimed is:

1. A process for altering the organoleptic properties of a tomato soup mix which comprises adding to said tomato soup mix 2-phenyl-4-pentenal and then bringing the resulting mixture to a boil, the amount of 2-phenyl-4-pentenal being in effective amount to impart a fresh tomato character to the soup mix.

* * * * *